United States Patent Office 3,522,293
Patented July 28, 1970

---

3,522,293
SELECTED 3-(TRIFLUOROMETHYLTHIO) PROPIONYL COMPOUNDS
John Ferguson Harris, Jr., Wilmington, Del., assignor to E. I. du Pont de Nemours and Company, Wilmington, Del., a corporation of Delaware
No Drawing. Continuation-in-part of application Ser. No. 276,072, Apr. 26, 1963. This application Mar. 26, 1965, Ser. No. 443,081
Int. Cl. C07c *69/24, 121/00, 69/62*
U.S. Cl. 260—481                             4 Claims

ABSTRACT OF THE DISCLOSURE

The novel lower-alkyl esters of 3-(trifluoromethylthio)propionic acid are described. All are useful as plant protectants.

---

RELATED APPLICATION

This application is a continuation-in-part of my application Ser. No. 276,072, filed Apr. 26, 1963, and now abandoned.

DESCRIPTION OF THE INVENTION

This invention relates to, and has as its principal objects provision of, a new (fluoroalkylthio)-alkanoic acid and some of its derivatives and methods of preparing these compounds.

The new products of this invention are 3-(trifluoromethylthio)propionic acid, its lower alkyl esters, salts, nitrile, amide and N-lower hydrocarbylamides; and 3-(trifluoromethylthio)-1-propanol. Thus, they can be represented by the formulas $(CF_3SCH_2CH_2COO)_nX$, where X is hydrogen, another cation or a 1–6 carbon alkyl group, and $n$ is the valence of X;

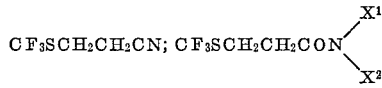

where $X^1$ and $X^2$ separately are hydrogen or 1–6 carbon hydrocarbyl, or together are 4–5 carbon alkylene; and $CF_3SCH_2CH_2CH_2OH$.

The compounds of this invention possess high activity as plant protectants against soil fungi. It is unexpected and quite surprising to find this valuable property present in compounds of this type, since previously reported, chemically closely related (fluoroalkylthio)-alkanoic acids and esters completely lack such activity, as will be shown later in greater detail. These compounds are also plant protectants against nematodes and insects, and thus have rather broad usefulness as pest-control agents.

The alkyl 3-(trifluoromethylthio)propionates are prepared by subjecting to ultraviolet light irradiation a mixture of a lower alkyl acrylate with an at least molar equivalent of trifluoromethanethiol. The principal reaction which takes place is represented by the equation:

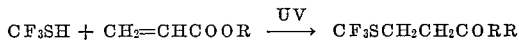

where R is a 1–6 carbon alkyl group. The free 3-(trifluoromethylthio)propionic acid can be obtained by acid hydrolysis of any of the esters thus formed. The salts of 3-(trifluoromethylthio)propionic acid can be prepared in any appropriate conventional manner, for example, by neutralization of the free acid with the requisite inorganic or organic base or, in the case of the alkali metal salts, by hydrolysis of an ester with an alkali metal hydroxide under mild conditions. Salts of various metals can also be obtained from the alkali metal salts by conventional metathetical reactions. The amide and N-substituted amides of 3-(trifluoromethylthio)propionic acid are prepared in the usual manner by reacting the acid chloride with ammonia or a primary or secondary hydrocarbon amine of 1–6 carbon atoms, and 3-(trifluoromethylthio)-propionitrile is prepared by dehydrating 3-(trifluoromethylthio)propionamide with a strong dehydrating agent such as phosphorus pentoxide. 3-(trifluoromethylthio)-1-propanol is prepared by a process analogous to that used for the preparation of the 3-(trifluoromethylthio)propionates, which consists in irradiating with ultraviolet light a mixture of allyl alcohol with an at least molar equivalent of trifluoromethanethiol, in accordance with the equation:

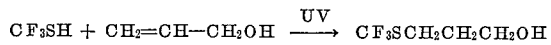

In the above-noted preparation of the alkyl 3-(trifluoromethylthio)propionates, a competing reaction takes place whereby an adduct of two moles of the acrylate and one mole of trifluoromethanethiol is formed. This 2:1 adduct is a dialkyl α-[(trifluoromethylthio)methyl]-glutarate of the formula

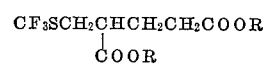

This reaction is, however, not the preponderant one, the main product benig the 1:1 adduct, i.e., the alkyl 3-(trifluoromethylthio)propionate. Furthermore, the secondary reaction can be minimized by using the trifluoromethanethiol in at least 1:1 molar ratio, and preferably in 50–100% molar excess thereover, relative to the alkyl acrylate, and by adding the acrylate in small increments to the trifluoromethanethiol, thus maintaining a relatively high proportion of the latter.

The initiator for this reaction, as well as for the analogous reaction of allyl alcohol with trifluoromethanethiol, is light of wavelength in the ultraviolet range (about 1800–3800 A. units). Any suitable source of ultraviolet light can be used, such as a mercury vapor arc, a sunlamp, etc. Appreciable conversions are obtained with irradiation periods as low as one or two hours, but irradiation is advantageously conducted for periods of 12–24 hours. When the light source is external, the reaction vessel should be constructed of a material, such as quartz, which transmits ultraviolet light, or it should be provided with a window made of such material. On a larger than laboratory scale, the light source is advantageously located inside the reaction vessel.

Since trifluoromethanethiol boils at −37° C., the reaction is conducted either in a closed system at the autogenous pressure developed by the reactants at the operating temperature, or at atmospheric pressure in an apparatus provided with a reflux condenser maintained at a temperature below −37° C. The reaction proceeds at an external temperature as low as −20° C. or even lower. It is conveniently conducted at ambient temperatures of the order of 15–25° C., although higher external temperatures, e.g., up to 75–100° C., can be used when operating under pressure.

A diluent or solvent is not necessary, but may be useful to provide a high-boiling liquid medium, thereby reducing the amount of cooling and/or the pressure required to maintain the trifluoromethanethiol in the liquid phase. The haloalkanes such as carbon tetrachloride, trichlorofluoromethane or sym.-tetrachlorodifluoroethane, or the aromatic hydrocarbons such as benzene or toluene, are examples of suitable diluents.

The resulting alkyl 3-(trifluoromethylthio)-propionate or 3-(trifluoromethylthio)-1-propanol, as the case may be, is readily separated from any unreacted starting materials and by-products by fractional distillation, preferably at reduced pressure.

3-(trifluoromethylthio)propionic acid is obtained by hydrolyzing any of its alkyl esters according to known methods. The preferred hydrolytic agents are aqueous solutions of the strong, nonoxidizing inorganic acids such as sulfuric acid, hydrochloric acid or phosphoric acid, desirably used at temperatures in the range of 50–150° C. As already mentioned, salts of 3-(trifluoromethylthio) propionic acid in which the cation is either inorganic (metal and ammonium salts) or organic (amine salts), as well as the amides and nitrile of 3-(trifluoromethylthio) propionic acid, are prepared by conventional, well-known methods which do not require discussion.

When applied to soil infested with fungi such as Rhizoctonia or Pythium, 3-(trifluoromethylthio)propionic acid, its alkyl esters, salts, amides and nitrile, and 3-(trifluoromethylthio)-1-propanol show high plant protectant activity. In laboratory tests on infested soil, using cotton seedlings as the test plant, complete plant protection was obtained at low dosages of 0.5–4 lb./acre applied in the furrow and very substantial protection at dosages as low as 0.2–0.5 lb./acre in the furrow. Under field conditions, the dosage is generally between 0.5 and 20 lb./acre. The optimum dosage can be determined in each instance by conventional methods. It is, of course, determined by and dependent upon such factors as the particular compound selected, the method of application, the type of soil, and the climatic conditions.

Plant protectant compositions are prepared by mixing, in sufficient amount to exert plant protectant action, one or more of the above-described active compounds with a carrier material or conditioning agent of the kind used and commonly referred to in the art as a pest control adjuvant or modifier. The conventional pest control adjuvants are inert solids, hydrocarbon liquid diluents, and surface-active agents. They provide formulations adapted for ready and efficient application using conventional applicator equipment. Usually from about 1 to 95% by weight of the plant protectant composition is active ingredient.

Solid compositions are preferably in the form of powders. They are compounded to homogeneous powders that either can be used as such, diluted with inert solids to form dusts, or suspended in a suitable liquid medium for spray application. The powders usually comprise active ingredient admixed with minor amounts of a conditional agent.

Natural clays, either absorptive such as attapulgite or relatively nonabsorptive such as china clays, diatomaceous earth, walnut shell flour, redwood flour, synthetic fine silica, calcium silicate and other inert solid carriers of the kind conventionally used in powder plant protectant compositions can be used. The active ingredient usually makes up from about 25 to 90% of these powder compositions. For conversion of the powders to dusts, talc, pyrophyllite, tobacco dust, volacnic ash and other dense, rapid-settling, inert solids customarily are used.

Liquid compositions employing one or more of the active ingredients are prepared by admixing the active ingredients with a suitable liquid diluent medium. The active ingredients can be either in solution or in suspension in the liquid medium. Typical of the liquid media commonly employed as plant protectant adjuvants are kerosene, Stoddard solvent, xylene, alcohols, alkylated naphthalenes, and glycols. The active ingredient usually makes up from about 0.5 to 80% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the composition to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, etc. A detailed list of such agents is set forth in an article by McCutcheon in "Soap and Sanitary Chemicals," August, September and October 1949.

The following examples illustrate the invention:

Example 1.—Methyl 3-(trifluoromethylthio)propionate

A mixture of 24 g. of freshly distilled methyl acrylate and 50 g. of trifluoromethanethiol contained in a quartz reaction vessel fitted with a reflux condenser cooled with a Dry Ice-acetone mixture was irradiated with a low pressure mercury lamp for a period of 16 hours at room temperature. Distillation of the reaction mixture yielded two products:

(A) Methyl 3-(trifluoromethylthio)propionate,

B.P. 66–67° C./34 mm.; $n_D^{25}$ 1.3920.

Analysis.—Calcd. for $C_5H_7F_3O_2S$ (percent): C, 31.9; H, 3.8; S, 17.0. Found (percent): C, 32.2; H, 3.9; S, 16.9.

The assigned structure is supported by the proton nuclear magnetic resonance pattern observed for this compound and those of the other examples.

(B) Dimthyl α-[(trifluoromethylthio)methyl]glutarate,

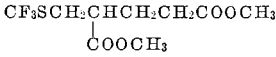

B.P. 150° C./35 mm.; $n_D^{25}$ 1.4223.

Analysis.—Calcd. for $C_9H_{13}F_3O_4S$ (percent): C, 39.4; H, 4.8; S, 11.7. Found (percent): C, 39.6; H, 4.8; S, 12.2.

In subsequent preparations, maximum yields of the 1:1 adduct were obtained by adding the methyl acrylate to the reaction mixture in small increments.

Example 2.—3-(trifluoromethylthio)propionic acid

A mixture of 150 ml. of water, 50 ml. of concentrated hydrochloric acid, and 29.9 g. of methyl 3-(trifluoromethylthio)propionate was refluxed for a period of 18 hours. The mixture was cooled, the organic layer separated and the aqueous layer extracted twice with 50 ml. of ether. The ether extracts and the organic layer were combined, dried over anhydrous magnesium sulfate, and distilled through a small spinning band still. There was obtained 16.9 g. of 3-(trifluoromethylthio)propionic acid distilling at 108° C./22 mm.; $n_D^{23.5}$ 1.4032.

Analysis.—Calcd. for $C_4H_5F_3O_2S$ (percent): C, 27.6; H, 2.9; F, 32.7; S, 18.4. Found (percent): C, 27.2; H, 2.9; F, 33.0; S, 18.7.

Example 3.—Ethyl 3-(trifluoromethylthio)propionate

To 62 g. of trifluoromethanethiol contained in a quartz reactor fitted with an acetone-Dry Ice reflux condenser and a dropping funnel was added 1.85 g. of freshly distilled ethyl acrylate. The mixture was irradiated with a low pressure mercury lamp for a period of one-half hour. This procedure was repeated eight times and then 6.5 g. of ethyl acrylate was added (total: 23.1 g.) followed by 18 hours of irradiation. Upon distillation of the reaction mixture, two products were obtained:

(A) Ethyl 3-(trifluoromethylthio)propionate (21.5 g.; 48% yield based on the ethyl acrylate), B.P. 74–79° C./25 mm.; $n_D^{25}$ 1.3923–1.3929.

Analysis.—Calcd. for $C_6H_9F_3O_2S$ (perecnt): C, 35.6; H, 4.5; F, 28.2; S, 15.9. Found (percent): C, 36.0; H, 4.8; F, 28.0; S, 16.1.

(B) Diethyl α-[(trifluoromethylthio)methyl]glutarate (8.8 g.; 25.4% yield based on the ethyl acrylate), B.P. 101–106° C./1.1 mm.; $n_D^{25}$ 1.4197–1.4199.

Analysis.—Calcd. for $C_{11}H_{17}F_3O_4S$ (percent): C, 43.7; H, 5.7; F, 18.9; S, 10.6. Found (percent): C, 43.6; H, 5.7; F, 19.4; S, 11.0.

Example 4.—n-Butyl 3-(trifluoromethylthio) propionate

To 65 g. of trifluoromethanethiol contained in the apparatus of Example 3 was added 2.7 g. of freshly distilled n-butyl acrylate and the mixture was irradiated for one-half hour. This procedure was repeated until a total of 27 g. of n-butyl acrylate had been added and then the mixture was irradiated for about 18 hours. Upon distillation two products were obtained.

(A) n-Butyl 3-(trifluoromethylthio)propionate (27.5 g.; 57% yield based on the butyl acrylate), B.P. 100–102° C./25 mm.; $n_D^{25}$ 1.4032–1.4033.

*Analysis.*—Calcd. for $C_8H_{13}F_3O_2S$ (percent): C, 41.7; H, 5.7; F, 24.8; S, 13.9. Found (percent): C, 42.3; H, 5.8; F, 24.6; S, 14.1.

(B) Di-n-butyl α - [(trifluoromethylthio)methyl]-glutarate (7.2 g.; 19.2% yield based on the butyl acrylate), B.P. 104–105° C./0.20 mm.; $n_D^{25}$ 1.4272.

*Analysis.*—Calcd. for $C_{15}H_{25}F_3O_4S$ (percent): C, 50.2; H, 7.0; F, 15.9; S, 8.9. Found (percent): C, 50.2; H, 6.9; F, 16.1; S, 8.7.

Other esters of 3-(trifluoromethylthio)propionic acid that can be prepared by the described procedure include the n-propyl, isopropyl, sec. butyl, isobutyl, tert. butyl, n-amyl, isoamyl, neopentyl, n-hexyl, 3-methylpentyl, etc., esters.

Example 5.—Sodium 3-(trifluoromethylthio) propionate

To a stirred mixture of 5 g. of 3-(trifluoromethylthio) propionic acid and 75 ml. of water containing a drop of phenolphthalein solution was added dropwise a 13% solution of sodium hydroxide in water until the mixture was slightly alkaline. The solution was then evaporated to dryness under reduced pressure with gentle heating. There was thus obtained 4.61 g. of sodium 3-(trifluoromethylthio)propionate as a freely flowing white powder.

*Analysis.*—Calcd. for $C_4H_4F_3O_2NaS$ (percent): F, 29.1; S, 16.4. Found (percent): F, 28.3; S, 16.1.

Example 6.—Diethylammonium 3-(trifluoromethylthio)propionate

To a solution of 5 g. (0.0287 mole) of 3-(trifluoromethylthio)propionic acid in 15 ml. of pentane was added 2.1 g. (0.0287 mole) of diethylamine. This caused the separation of a second liquid phase. The mixture was stirred for 10 minutes and then the bottom layer was separated and extracted once with 10 ml. of pentane. There was thus obtained 4.43 g. of diethylammonium 3-(trifluoromethylthio)propionate as a colorless liquid, $n_D^{25}$ 1.4168.

Among other salts of 3-(trifluoromethylthio)propionic acid that can be prepared by appropriate procedures may be mentioned in particular the salts of metals of Groups I, II, IV–A and VIII of the Periodic Table, examples of which are lithium, potassium, cesium, copper, silver, magnesium, calcium, barium, zinc, cadmium, mercury, iron, nickel, tin and lead salts, i.e., the salts of the formula $(CF_3SCH_2CH_2COO{-})_nM^+$, where M is the metal cation and $n$ is the valence of the metal, $n$ being preferably 1 or 2, the alkali metal salts being the preferred ones; and the ammonium and substituted ammonium (i.e., primary, secondary, and tertiary amine salts) these salts having the formula

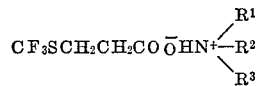

where $R^1$, $R^2$ and $R^3$ are hydrogen, separated hydrocarbon radicals or hydrocarbon radicals which, together and jointly with the amino nitrogen, form a heterocyclic ring of 5 to 6 ring atoms. Preferably, $R^1$, $R^2$ and $R^3$ are hydrogen or hydrocarbyl of 1–6 carbon atoms, particularly alkyl. Examples of such salts are those in which the

cation is ammonium, methylammonium, triethylammonium, di-propylammonium, di-n-hexylammonium, dicyclohexylammonium, phenylammonium, pyrrolidinium, N-methylpiperidinium, pyridinium, etc.

Example 7.—3-(trifluoromethylthio)propionamide

A mixture of 4.44 g. of 3-(trifluoromethylthio)-propionic acid and 5 ml. of thionyl chloride was stirred at room temperature for about 16 hours, then heated at gentle reflux for 5 hours. Fractionation of the reaction product gave 2.74 g. of 3-trifluoromethylthio)propionyl chloride, B.P. 61–63.5° C. at 33 mm. pressure.

This product was dissolved in 50 ml. of diethyl ether and dry ammonia gas was passed through the stirred solution until it was no longer absorbed. The reaction mixture was diluted with more ether and filtered. Evaporation of the filtrate to dryness left 1.76 g. of 3-(trifluoromethylthio)propionamide as a white crystalline solid, M.P., 69–71° C. This was recrystallized by dissolving it in 10 ml. of warm benzene, filtering, adding 5 ml. of pentane and cooling. The purified product melted at 70.5–71° C.

*Analysis.*—Calc'd for $C_4H_6F_3NOS$ (percent): F, 32.9; N, 8.1; S, 18.5. Found (percent): F, 32.63; N, 7.92; S, 19.07.

Other amides of 3-(trifluoromethylthio)propionic acid can be prepared similarly by reacting the acid chloride with a primary or secondary amine

where $X^1$ and $X^2$, taken separately, are hydrogen or 1–6 carbon hydrocarbyl radicals (alkyl, alkenyl, cycloalkyl, aryl, and preferably alkyl), and, taken together, are an alkylene radical of 4–5 carbon atoms, i.e., form together with the amino nitrogen a heterocyclic ring of 5–6 ring members. Examples of such N-substituted amides are the compounds

in which the group

is methylamino, dimethylamino, ethylamino, allylamino, ethylpropylamino, di-n-butylamino, n-hexylamino, cyclopentylamino, dicyclohexylamino, anilino, methylphenylamino, pyrrolidino and piperidino.

Example 8.—3-(trifluoromethylthio)propionitrile

A mixture of 7.3 g. of finely ground 3-(trifluoromethylthio)propionamide and 25 g. of phosphorus pentoxide was placed in a round bottomed flask connected to an ice-cooled receiver through a small still head. The receiver was itself connected to a water pump through two traps cooled with a Dry Ice-acetone mixture. The flask was heated under an internal pressure of about 15 mm. Droplets of condensate began to form when the temperature of the heating bath reached 90° C. Heating was continued up to a bath temperature of 175° C., at which point it was maintained for 1.5 hours. Heating was then discontinued and the contents of the ice-cooled receiver and the traps were combined. This material (4.82 g.) was distilled through a spinning band still to give 3.45 g. of 3-trifluoromethylthio)propionitrile, B.P., 71–73° C. at 17 mm. pressure, $n_D^{25}$ 1.3958.

*Analysis.*—Calc'd for $C_4H_4F_3NS$: (percent): C, 31.0; H, 2.6; S, 20.7. Found (percent): C, 31.17; H, 2.50; S, 20.46.

Example 9.—3-(trifluoromethylthio)-1-propanol

Into a quartz tube containing 25 ml. of allyl alcohol was introduced 41 g. of trifluoromethanethiol. An exothermic reaction took place during this addition. The mixture was then irradiated with ultraviolet light for 2.5 hours at ambient temperature, after which it was distilled through a small fractionating column. A major fraction (14.9 g., B.P., 59–62° C. at 14 mm. pressure, $n_D^{25}$ 1.4001) was separated from higher boiling fractions. This product was 3-(trifluoromethylthio)-1-propanol, as shown by elemental analysis.

*Analysis.*—Calc'd for $C_4H_7F_3OS$: (percent): C, 30.0, H, 4.37; S, 20.0. Found (percent): C, 30.36; H, 4.51; S, 20.36.

This product was combined with the corresponding fraction from a similar preparation and the combined material was dried over anhydrous magnesium sulfate and redistilled to give a product boiling within a narrow range (60—61° C. at 10 mm. pressure; $n_D^{25}$ 1.4052).

As noted above, the compounds of this invention possess plant protectant activity. This activity is shown in the examples which follow.

Example A

In greenhouse experiments designed to test plant protectant activity against fungi, the compounds listed below were mixed at the dosages also shown below, concentrated in the furrow, with soil infested with (a) Rhizoctonia, and (b) Pythium. Cotton seeds were planted in these soils and the growth of the seedlings observed in comparison with that of controls set in noninfested soil and in infested, nontreated soil. The results of these in-the-furrow applications are shown in the above table.

In comparison, such closely related compounds as the previously reported [(2-chloro-1,1,2-trifluoroethyl)-thio]acetic acid, $HCFClCF_2SCH_2COOH$ (U.S. Pat. 2,754,334); [(1,1,2,2 - tetrafluoroethyl)thio]acetic acid, $HCF_2CF_2SCH_2COOH$ [England et al., J. Am. Chem. Soc. 82, 5116 (1960)]; and the methyl esters of these acids show complete inactivity at 33 lb./acre in similar tests, even under conditions (tests in closed containers rather than in the row) which are usually more favorable to the agent being tested.

Example B

Experiments generally similar to those of Example A were carried out to test the plant protectant properties against nematodes of the products of this invention, using cucumber plants as the test plants. The compounds listed in the table below gave very effective protection, at the dosages indicated, against the root knot nematode *Meloidogyne incognita*.

| Compound: | Dosage (lb./acre) |
|---|---|
| $CF_3SCH_2CH_2COOH$ | 2 |
| $CF_3SCH_2CH_2COOC_2H_5$ | 3 |
| $CF_3SCH_2CH_2COOC_4H_9(n)$ | 5 |
| $CF_3SCH_2CH_2COONa$ | 3 |
| $CF_3SCH_2CH_2COONH_2(C_2H_5)_2$ | 5 |
| $CF_3SCH_2CH_2COONO^-N^+H_2(C_2H_5)_2$ | 5 |
| $CF_3SCH_2CH_2CH_2OH$ | 3 |

Example C

In experiments designed to test plant protectant activity against insects, an emulsifiable oil of the following composition was made up by simple mixing of the components to give a clear solution:

|  | Percent |
|---|---|
| 3-(trifluoromethylthio)propionic acid, butyl ester | 25 |
| Mixed polyoxyethylene ethers and oil soluble petroleum sulfonates | 6 |
| Xylene | 69 |

This composition was then diluted with water to a concentration of 0.15% by weight of active ingredient and applied as a soil drench (600 to 800 gallons per acre) to the root-zone of established ornamental plants growing in moist soil. The plants were rendered toxic to attacking aphids for an extended period of time.

|  | Activity against | |
|---|---|---|
| Compound | Rhizoctonia | Pythium |
| $CF_3SCH_2CH_2COOCH_3$ | 100% at 0.5 lb./acre / 70% at 0.2 lb./acre | 100% at 0.5 lb./acre |
| $CF_3SCH_2CH_2COOC_2H_5$ | 100% at 4 lb./acre | 100% at 1 lb./acre |
| $CF_3SCH_2CH_2COOC_4H_9(n)$ | 50% at 1 lb./acre / 100% at 0.5 lb./acre | 70% at 0.5 lb./acre / 100% at 1 lb./acre |
| $CF_3SCH_2CH_2COOH$ | 100% at 1 lb./acre / 90% at 0.5 lb./acre | 100% at 1 lb./acre / 90% at 0.5 lb./acre |
| $CF_3SCH_2CH_2CONH_2$ | 100% at 0.5 lb./acre | 100% at 1 lb./acre |
| $CF_3SCH_2CH_2CN$ | do | 100% at 0.5 lb./acre |
| $CF_3SCH_2CH_2COONa$ | do | Do. |
| $CF_3SCH_2CH_2COO^-\overset{+}{N}H_2(C_2H_5)_2$ | 100% at 1 lb./acre / 90% at 0.5 lb./acre | 100% at 1 lb./acre |
| $CF_3SCH_2CH_2CH_2OH$ | 100% at 1 lb./acre / 70% at 0.5 lb./acre | 100% at 1 lb./acre / 70% at 0.5 lb./acre |

The embodiments of the invention in which an exclusive property or privilege is claimed are defined as follows:

1. A compound of the formula $CF_3SCH_2CH_2COOX$ where X is lower alkyl.
2. Methyl 3-(trifluoromethylthio)propionate.
3. Ethyl 3-(trifluoromethylthio)propionate.
4. n-Butyl 3-(trifluoromethylthio)propionate.

References Cited
UNITED STATES PATENTS

| | | | |
|---|---|---|---|
| 2,773,089 | 12/1956 | Anderson | 260—465.7 |
| 2,782,218 | 2/1957 | Drysdale | 260—465.7 |
| 3,065,161 | 11/1962 | Protzer | 204—158 |
| 3,080,305 | 3/1963 | Gorsich | 204—158 |
| 3,003,914 | 10/1961 | Youngson et al. | 167—22 |
| 3,018,218 | 1/1962 | Duggins | 167—22 |
| 3,052,726 | 9/1962 | Middleton | 260—609 |
| 3,172,910 | 3/1965 | Brace | 260—465.7 X |

JOSEPH PAUL BRUST, Primary Examiner

U.S. Cl. X.R.

204—158; 260—294.8, 326.84, 429, 429.7, 429.9, 430, 431, 435, 438.1, 439, 465.2, 465.7, 501.1, 501.15, 539, 561, 562, 609; 424—263, 274, 287, 304, 311, 317, 320